(12) United States Patent
Bauman et al.

(10) Patent No.: US 9,217,407 B2
(45) Date of Patent: Dec. 22, 2015

(54) MECHANICAL LIFTER

(71) Applicant: GM GLOBAL TECHNOLOGY OPERATIONS LLC, Detroit, MI (US)

(72) Inventors: William D Bauman, Dorr, MI (US); Gerald R Stabel, Zeeland, MI (US); Carl Ralph Kangas, Sand Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 336 days.

(21) Appl. No.: 13/785,450

(22) Filed: Mar. 5, 2013

(65) Prior Publication Data

US 2014/0251283 A1  Sep. 11, 2014

(51) Int. Cl.
*F02M 69/02* (2006.01)
*F16H 25/14* (2006.01)
*F02M 59/44* (2006.01)
*F04B 53/14* (2006.01)
*F16H 53/06* (2006.01)

(52) U.S. Cl.
CPC .............. *F02M 69/02* (2013.01); *F02M 59/445* (2013.01); *F04B 53/14* (2013.01); *F16H 25/14* (2013.01); *F16H 53/06* (2013.01); *F02M 2200/9015* (2013.01); *Y10T 74/18288* (2015.01)

(58) Field of Classification Search
CPC .......... F02M 69/02; F02M 2200/9015; F02M 59/445; F16H 25/14; F16H 53/06; F04B 53/14; Y10T 74/18288
USPC .......... 123/495, 90.48, 90.51; 74/54; 264/279
See application file for complete search history.

(56) References Cited

U.S. PATENT DOCUMENTS

| 5,284,112 A * | 2/1994 | Takehara et al. ........... 123/90.48 |
| 2008/0006233 A1* | 1/2008 | Bartley et al. .............. 123/90.48 |
| 2011/0259142 A1* | 10/2011 | Copper et al. ................... 74/569 |

FOREIGN PATENT DOCUMENTS

WO    WO-2010/139663 A1 * 12/2010 ................. 123/90.48

* cited by examiner

*Primary Examiner* — Stephen K Cronin
*Assistant Examiner* — Xiao Mo
(74) *Attorney, Agent, or Firm* — Quinn Law Group, PLLC

(57) ABSTRACT

The mechanical lifter generally includes an inner lift member, an outer lift member, and a roller. The inner lift member is at least partly made of a metallic material. The outer lift member is at least partly made of a polymeric material and surrounds the inner lift member. The roller is rotatably coupled with respect to the inner lift member and is partly disposed within the inner lift member. The inner lift member is configured to move a first component in response to a force applied to the roller by a second component.

19 Claims, 3 Drawing Sheets

MECHANICAL LIFTER

TECHNICAL FIELD

The present disclosure relates to a lightweight mechanical lifter configured to move components such as fuel pump components or valvetrain components.

BACKGROUND

Mechanical lifters can be used to drive or move components such as fuel pump or valvetrain components. For example, in a conventional fuel pump, a mechanical lifter can move a piston or plunger in response to a force applied by an engine component such as a camshaft.

SUMMARY

The present disclosure relates to mechanical lifters that can be used to move components such as fuel pump or valvetrain components. In an embodiment, the mechanical lifter generally includes an inner lift member, an outer lift member, and a roller. The inner lift member is at least partly made of a metallic material. The outer lift member is at least partly made of a polymeric material and surrounds the inner lift member. The roller is rotatably coupled with respect to the inner lift member and is partly disposed within the inner lift member. The inner lift member is configured to move a first component in response to a force applied to the roller by a second component.

In one aspect of the invention, the mechanical lifter has a mass ranging between about 68 grams and about 72 grams. For example, the mechanical lifter may have a mass of about 70 grams.

In one aspect of the invention, the outer lift member is molded over the inner lift member. The polymeric material that forms the outer lift member may include a polyamide. The polymeric material may also include a glass filled polyamide. For instance, the polymeric material may include a glass filled polyhexamethylneadipamide such as a 30% glass filled polyhexamethylneadipamide.

In one aspect of the invention, the inner lift member includes an inner member body having an outer surface. The outer lift member may be bonded to the outer surface of the inner member body.

In one aspect of the invention, the outer lift member includes an outer lift body and a protrusion extending outwardly from the outer lift body. The protrusion is shaped and sized to be slidably received in a groove of a housing so as to inhibit rotation of the mechanical lifter relative to the housing. The protrusion may be monolithically formed with the outer lift body.

The present disclosure also relates to vehicles such as cars. In an embodiment, the vehicle generally includes an engine configured to power the vehicle and a fuel pump assembly in fluid communication with the engine so as to supply fuel to the engine. The engine includes an engine component, such as a cam portion, configured to apply a force to a portion of the fuel pump assembly. The vehicle further includes a housing. The fuel pump assembly includes a pump body affixed to the housing. The pump body defines a pump bore defining a stroke axis. The fuel pump assembly further includes a plunger at least partly disposed in the pump bore. The plunger is operatively coupled to the pump body. As such, the plunger is configured to move relative to the pump bore along the stroke axis. The fuel pump assembly includes a mechanical lifter disposed within the housing. The mechanical lifter is operatively coupled to the plunger. Consequently, the plunger is configured to move relative to the pump bore along the stroke axis upon movement of the mechanical lifter relative to the housing. The mechanical lifter generally includes an outer lift member and an inner lift member. The inner lift member is at least partly disposed within the outer lift member. The outer lift member is made of a polymeric material and is molded over the inner lift member. The mechanical lifter further includes a roller rotatably coupled with respect to the inner lift member. The roller is partly disposed within the inner lift member. The engine component is configured to apply a force to the roller so as to move the mechanical lifter relative to the housing along the stroke axis.

In one aspect of the invention, the inner lift member may be made of a metallic material.

In one aspect of the invention, the mechanical lifter has a mass ranging between about 68 grams and about 72 grams. For instance, the mechanical lifter may have a mass of about 70 grams.

In one aspect of the invention, the polymeric material includes a polyamide. The polyamide may be a polyhexamethylneadipamide, poly-6-caprolactam, or a combination thereof. The polyamide may be embedded with glass fibers.

In one aspect of the invention, the housing has an inner housing surface and a groove that extends into the inner housing surface. The outer lift member includes an outer lift body and a protrusion extending from the outer lift body. The protrusion is shaped and sized to be slidably received in the groove so as to inhibit rotation of the mechanical lifter about the stroke axis.

The present disclosure also relates to methods of manufacturing a mechanical lifter. In an embodiment, the method includes molding a polymeric outer lift member over an inner lift member so as to bond or couple the polymeric outer lift member to the inner lift member, wherein the inner lift member includes a metallic inner member body and a roller coupled within the inner member body. The roller is configured to rotate relative to the inner member body.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
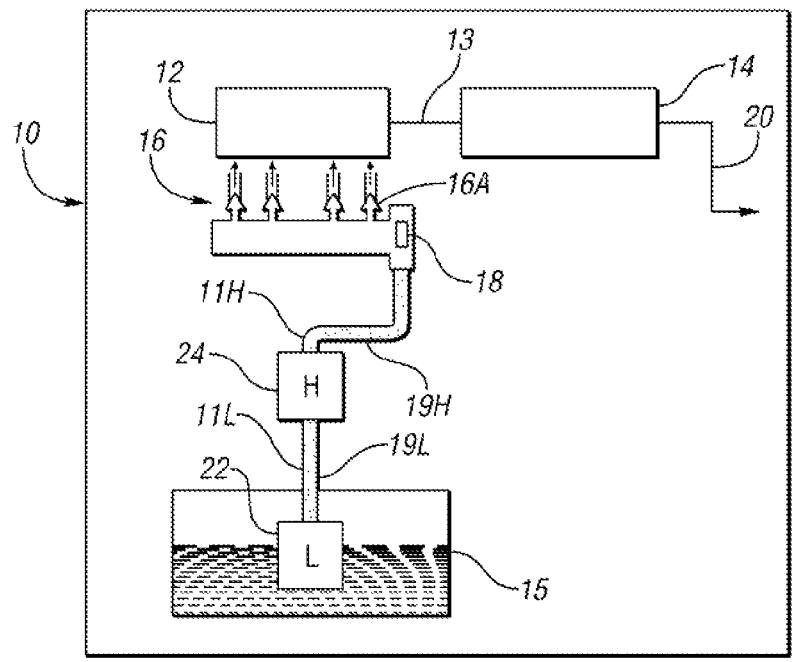
FIG. 1 is a schematic illustration of a vehicle including a combustion engine and a fuel pump assembly in accordance with an embodiment of the present invention.

Referring to the drawings, wherein like reference numbers correspond to like or similar components throughout the several figures, and beginning with FIG. 1, a vehicle 10 includes an engine 12 in driving connection with a transmission 14. The transmission 14 includes an input member 13 configured to receive power from the engine 12 and an output member 20 that is connected to a plurality of wheels (not shown). The engine 12 may be configured as a Spark Ignition Direct Injection (SIDI) engine, a diesel engine, or another engine utilizing a high-pressure supply of combustible fuel, the operation of which are known to those skilled in the art.

The vehicle 10 includes a low-pressure fuel supply, reservoir, or tank 15 containing a low-pressure amount of combustible fuel 19L, with the character "L" representing relatively low-pressure throughout the various Figures. A supply pump 22, which is also labeled "L" in FIG. 1 to represent low pressure, is positioned within the tank 15 and is operable for pressurizing the fuel 19L to approximately 4 to 6 bars, or to any other pressure level that is sufficient for moving the fuel 19L from the tank 15 to a high-pressure (HP) fuel pump assembly 24, with the character "H" used in the various Figures to represent high-pressure. A low-pressure fuel line 11L, such as tubing, piping, or other such fluid conduit, is connected between the supply pump 22 and the HP fuel pump assembly 24 to allow the fuel 19L to pass or flow therebetween.

The HP fuel pump assembly 24 is operable for rapidly pressurizing the fuel 19L to at least approximately 150 to 200 bars in one embodiment, although lower pressures are usable within the scope of the invention, and for delivering the pressurized fuel 19H to a fuel rail 16 through a high-pressure fuel line 11H, and ultimately to a fuel delivery device, such as a plurality of fuel injectors 16A. The pressurized fuel 19H is directly injected into various combustion chambers (not shown) of the engine 12 via the fuel injectors 16A, with the fuel rail 16 having at least one pressure sensor 18 operatively connected thereto and configured for sensing a fuel pressure at or in proximity to the fuel rail 16. An electronic control unit or controller (not shown) is in electronic communication with the engine 12, the fuel rail 16, the supply pump 22, and the HP fuel pump assembly 24. In operation, this controller enables the control and/or synchronization of the various fuel delivery components.

Figure 2:
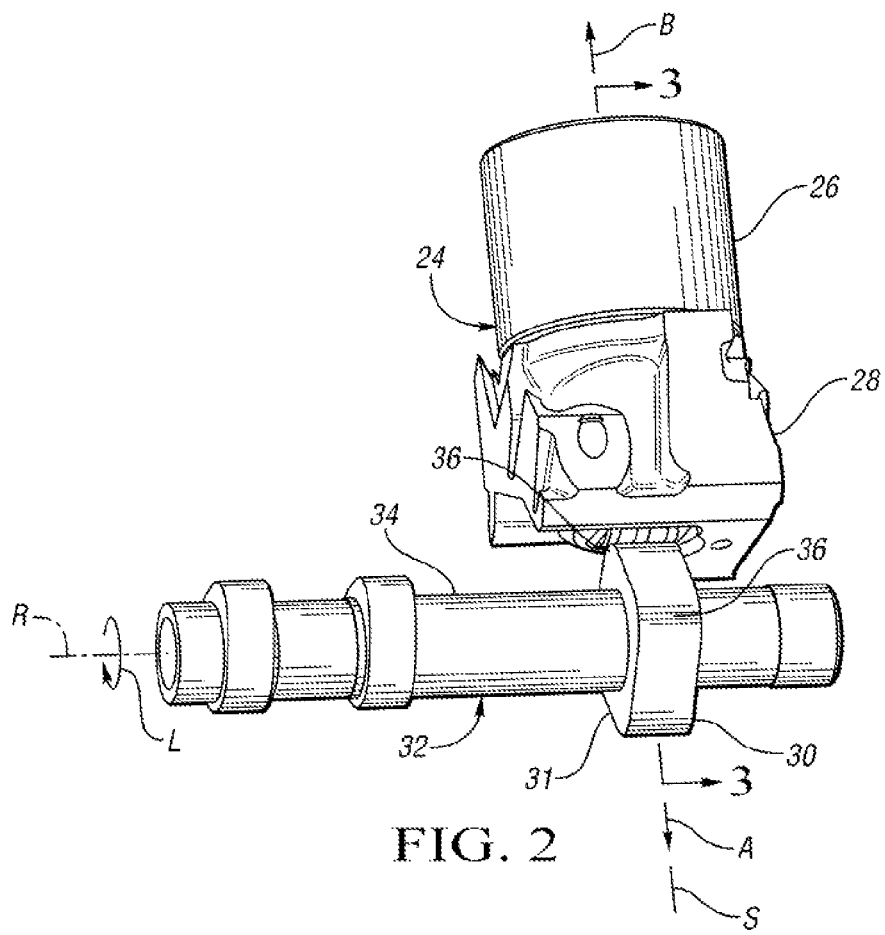
FIG. 2 is a perspective view of a representative fuel pump assembly including a mechanical lifter.

Referring now to FIG. 2, the fuel pump assembly 24 can pressurize the fuel 19L and deliver the pressurized fuel 19H to the fuel rail 16. To do so, the fuel pump assembly 24 includes a bushing or housing 28 and a pump body 26 that is affixed to the housing 28. The housing 28 may define a stroke axis and may be constructed of a metallic material such as aluminum, stainless steel or any other suitable material. The pump body 26 defines a pump bore 37 elongated along a stroke axis S. Thus, the pump body 26 may also define the stroke axis S. The pump bore 37 may also define the stroke axis S. As described below, the fuel pump assembly 24 can receive a force applied by an engine component 31, such as a cam portion 30, to pressurize a fluid contained within the pump body 26 as discussed in detail below. The engine component 31 can also be referred to as a second component. Specifically, the engine 12 includes a camshaft 32 having a shaft portion 34 and at least one cam portion 30 disposed on the camshaft 32. The cam portion 30 includes one or more lobes 36 and is disposed about the circumference or transverse dimension of the shaft portion 34. In the depicted embodiment, the cam portion 30 includes four lobes 36; however, the cam portion 30 may have more or fewer lobes 36. The shaft portion 34 is configured to rotate about a rotation axis R in a rotational direction L. However, the camshaft 32 may alternatively be configured to rotate about the rotation axis R in a direction opposite the rotational direction L.

Figure 3:
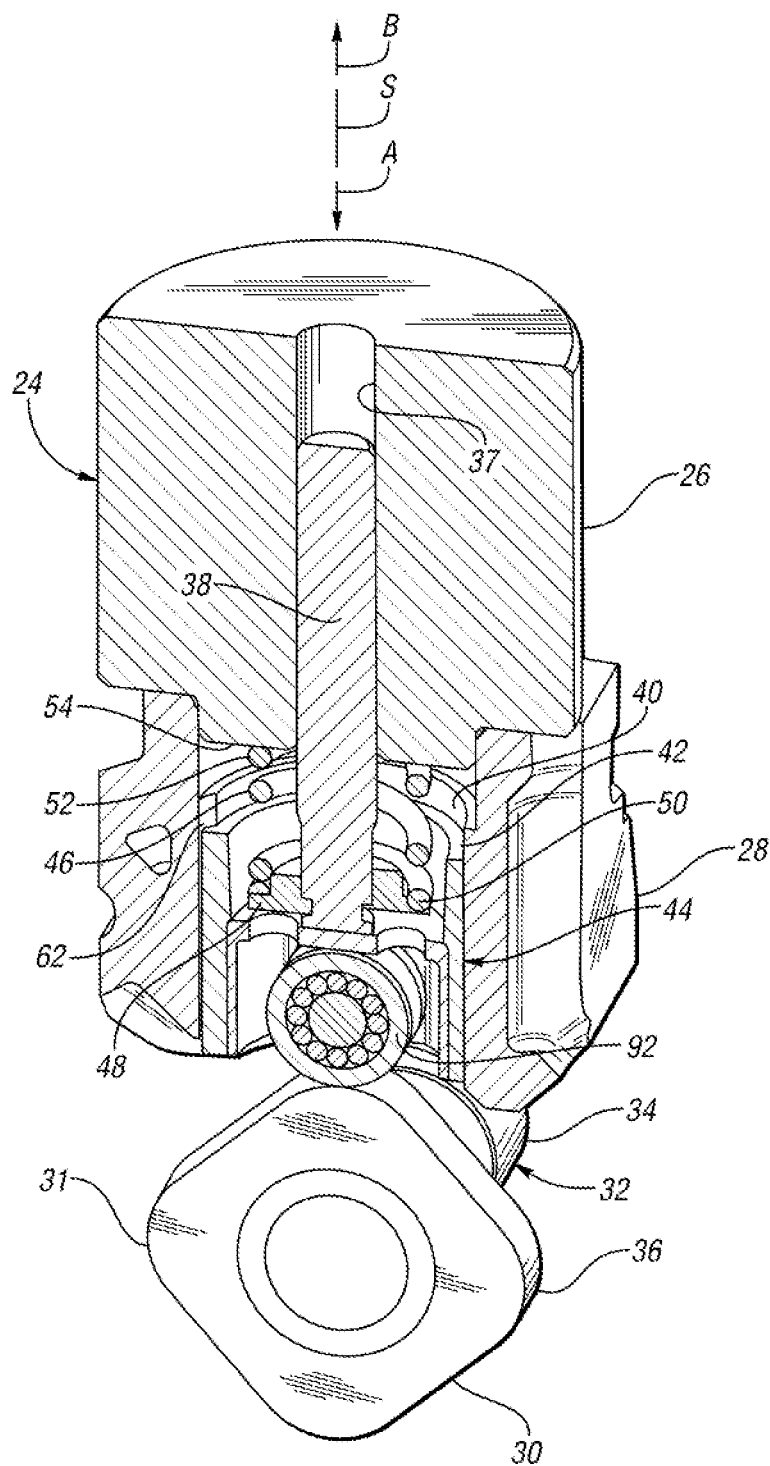
FIG. 3 is a perspective cross-sectional view of the fuel pump assembly shown in FIG. 2, taken along section 3-3 of FIG. 2.

Referring to FIG. 3, the fuel pump assembly 24 further includes a piston or plunger 38 movably coupled to the pump body 26. The plunger 38 is at least partly disposed in the pump bore 37 and is configured to move relative to the pump body 26 along the stroke axis S as the camshaft 32 rotates about the rotation axis R (FIG. 2). Specifically, the plunger 38 is configured to move relative to the pump bore 37 along the stroke axis S as the camshaft 32 rotates about the rotation axis R (FIG. 2). In the depicted embodiment, the plunger 38 is concentrically coupled to the pump body 26. At least a portion of the plunger 38 is disposed within the pump body 26, and another portion of the plunger 38 is disposed in a chamber 40 defined by the housing 28. The plunger 38 may be referred to as the first component.

The plunger 38 is configured to move with respect to the pump body 26 along the stroke axis S as the camshaft 32 rotates about the rotation axis R. In particular, upon rotation of the shaft portion 34 about the rotation axis R, the cam portion 30 applies a force to a portion of the fuel pump assembly 24 to drive a portion of the fuel pump assembly 24 along the stroke axis S in a reciprocating manner as described below. Specifically, the plunger 38 can move relative to the pump body 26 in a first direction indicated by arrow A to define an intake stroke to admit the low-pressure fuel 19L (FIG. 1) into the pump body 26. As the camshaft 32 continues to rotate about rotation axis R, one lobe 36 of the cam portion 30 eventually applies a force to a portion of the fuel pump assembly 24, thereby moving the plunger 38 in a second direction indicated by arrow B. This movement in the second direction, which is indicated by arrow B, defines a pressurization stroke or "upstroke" that pressurizes the low-pressure fuel 19L that was previously admitted into the pump body 26.

The housing 28 has an inner housing surface 42 that defines the chamber 40. The chamber 40 may be substantially cylindrical and is configured and sized to receive at least a portion of the plunger 38 as well as a mechanical lifter 44 as described in detail below. Aside from the chamber 40, the housing 28 further defines a groove 62 or any other suitable channel that extends into the inner housing surface 42. Accordingly, the groove 62 is open to the chamber 40. In the depicted embodiment, the groove 62 is elongated along a direction substantially parallel to the stroke axis S. However, the groove 62 may be oriented in other ways in relation to the stroke axis S. As discussed in detail below, the groove 62 is shaped and sized to receive a portion of the mechanical lifter 44 to guide the movement of the mechanical lifter 44 through the chamber 40.

The mechanical lifter 44 may be part of the fuel pump assembly 24 and is configured to drive the plunger 38 in the direction indicated by arrow B in response to a force applied by the cam portion 30. In particular, the mechanical lifter 44 is shaped, sized, and configured to be at least partially received in the chamber 40. In operation, the mechanical lifter 44 can move or slide through the chamber 40 along the stroke axis S as the camshaft 32 rotates about the rotation axis R (FIG. 2). A spring 46 or any other suitable biasing member is connected between the pump body 26 and the mechanical lifter 44 so as to bias the mechanical lifter 44 in the first direction indicated by arrow A. The fuel pump assembly 24 may include a washer 48 coupled between the mechanical lifter 44 and the spring 46. A first end 50 of the spring 46 rests on the washer 48, while a second end 52 of the spring 46 abuts a lower end surface 54 of the pump body 26. The connection of the spring 46 between the pump body 26 and the mechanical lifter 44 allows the spring 46 to bias the mechanical lifter 44 in the first direction indicated by arrow A. On the other hand, the mechanical lifter 44 is configured to apply a force to the plunger 38 to move the plunger 38 relative to the pump body 26 in the second direction indicated by arrow B against the bias of the spring 46.

Conventional mechanical lifters may be entirely made of a metallic material such as stainless steel. Accordingly, these conventional mechanical lifters are not necessarily lightweight and its manufacture may require the use of metalworking techniques such as machining, grinding, and cutting. Furthermore, conventional mechanical lifters sometimes include multiple metallic components, which require assembly. The assembly of these metallic components typically entails the employment of several manufacturing techniques such as cutting and staking. It is therefore desirable to simplify the manufacturing process of a mechanical lifter and minimize its weight. To minimize its weight and ease its manufacturing, the mechanical lifter 44 may be partly made of a polymeric material.

Figure 4:
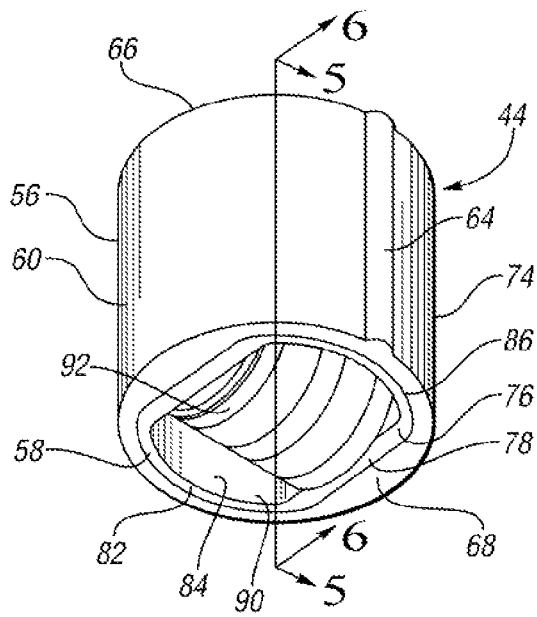
FIG. 4 is an enlarged perspective view of the mechanical lifter of the fuel pump assembly shown in FIG. 2.
Figure 5:
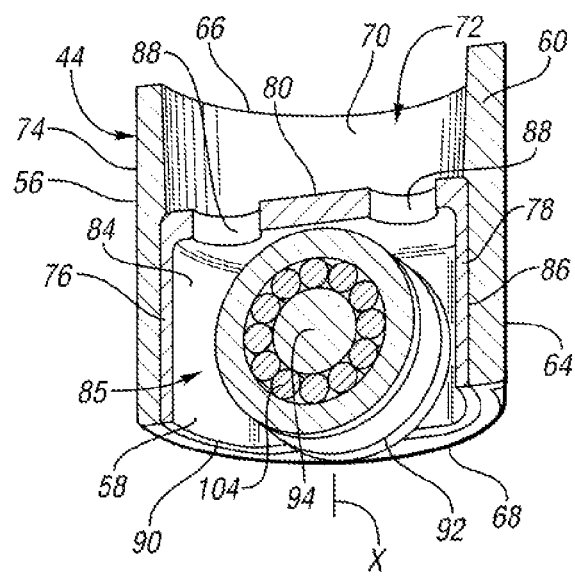
FIG. 5 is a perspective cross-sectional view of the mechanical lifter shown in FIG. 4, taken along section line 5-5 of FIG. 4.
Figure 6:
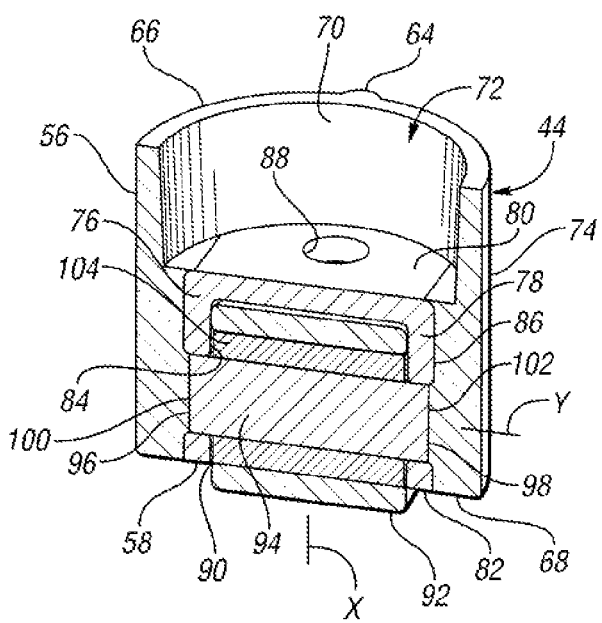
FIG. 6 is a perspective cross-sectional view of the mechanical lifter shown in FIG. 4, taken along section line 6-6 of FIG. 4.

Referring to FIGS. 4-6, the mechanical lifter 44 can be configured as a cam follower and generally includes an outer lift member 56 and an inner lift member 58 partly disposed within the outer lift member 56. The outer lift member 56 is substantially constructed of a suitable polymeric material and has a substantially cylindrical or annular shape. Because of its substantially annular shape, the outer lift member 56 may surround at least a portion of the inner lift member 58. The polymeric outer lift member 56 can be molded over the inner lift member 58. In other words, the polymeric outer lift member 56 can be overmolded to the inner lift member 58. Thus, the outer lift member 56 can be bonded or adhered to the inner lift member 58. As a result, the polymeric outer lift member 56 is fixed relative to the inner lift member 58. A suitable injection molding process can be employed to mold the outer lift member 56 over the inner lift member 58. It is important to make the outer lift member 56 of a polymeric material in order to minimize the weight and cost of the mechanical lifter 44. For instance, a conventional mechanical lifter typically has a mass of about 79 grams, whereas the mechanical lifter 44 has a mass ranging between about 68 grams and about 72 grams. In an embodiment, the mechanical lifter 44 has a mass of about 70 grams. It is important that the mechanical lifter 44 has the mass mentioned above in order to minimize manufacturing costs while providing sufficient structural integrity to maximize the service life of the fuel pump assembly 24. The use of the polymeric outer lift member 56 also simplifies the manufacturing process of the mechanical lifter 44 because it minimizes the need to employ metalworking techniques such as machining, grinding, and cutting. The mechanical lifter 44 with the polymeric outer lift member 56 can also be more wear resistance than a completely metallic mechanical lifter. Consequently, the use of the polymeric outer lift member 56 may extend the service life of the mechanical lifter 44.

As discussed above, the outer lift member 56 can be made of a polymeric material suitable for use in a fuel pump assembly. Suitable polymeric materials include, but are not limited to, polyamides. For example, the outer lift member 56 can be partly or wholly made of at least one polyamide such as poly-6-caprolactam (also known as polyamide 6 or nylon 6) and polyhexamethylneadipamide (also known as polyamide 6, 6 or nylon 6, 6). Moreover, the polymeric material of the outer lift member 56 can be filled or embedded with glass fibers to enhance its structural strength, impact strength and rigidity. For instance, the outer lift member 56 can be partly or wholly made of a glass filled polymer material such as glass filled polyamide 6 or glass filled polyamide 6, 6. In one embodiment, the outer lift member 56 is made of 30% filled polyamide 6; a 20% glass filled polyamide 6; a 30% glass filled polyamide 6, 6; a 20% polyamide 6, 6; or a combination thereof.

In particular, the 30% glass filled polyamide 6, 6 is very strong and is therefore wear resistance. Further, it is desirable to use 30% glass filled polyamide 6, 6 because it is oil resistance. However, other suitable polymeric wear resistance materials can be used to construct the outer lift member 56. For example, the outer lift member 56 can be partly or entirely made of a polymeric material that has a Rockwell hardness (M scale) at 23° Celsius ranging between about 65 M and about 85 M. In an embodiment, the outer lift member 56 is partly or wholly made of a polymeric material that has a Rockwell hardness (M scale) at 23° Celsius of about 76 M. It is important to develop the polymeric outer lift member 56 with the hardness values mentioned above to minimize wear of the outer lift member 56 when the mechanical lifter 44 moves through the chamber 40 of the housing 28. Moreover, the outer lift member 56 can be partly or wholly made of a polymeric material capable of maintaining its structural integrity at operating temperatures typical for internal combustion engines. For instance, the polymeric material should be able to maintain its structural integrity at temperatures ranging between about 82.22° Celsius (180° Fahrenheit) and 98.89° Celsius (210° Fahrenheit). Thus, the polymeric material of the outer lift member 56 may have a melting temperature ranging between about 200° Celsius (392° Fahrenheit) and about 300° Celsius (572° Fahrenheit). In an embodiment, the polymeric material of the outer lift member 56 has a melting temperature of about 255° Celsius (491° Fahrenheit). The melting temperatures mentioned above are important because, if the polymeric outer lift member 56 has the aforementioned melting temperatures, it is less likely that the outer lift member 56 will melt or lose its structural integrity while the engine 12 is operating.

The outer lift member 56 can be configured as a casing or enclosure and may have a substantially annular shape. In the depicted embodiment, the outer lift member 56 includes an outer lift body 60 that is elongated along a lift axis X. The outer lift body 60 has a first body end 66 and an opposite second body end 68 that is spaced from the first body end 66 along the lift axis X. The outer lift body 60 has an inner body surface 70 extending between the first body end 66 and the second body end 68. The inner body surface 70 defines an outer lift cavity 72 configured and sized to receive the inner lift member 58. The outer lift body 60 further includes an outer body surface 74 opposite the inner body surface 70.

In addition, the outer lift member 56 includes a protrusion 64 extending from the outer lift body 60 in an outward direction (i.e., away from the outer lift cavity 72). During operation, the protrusion 64 is configured, sized, and shaped to be slidably received in the groove 62 (FIG. 3) to perform at least two functions. First, the interaction between the groove 62 and the protrusion 64 serves to guide the movement of the mechanical lifter 44 relative to the housing 28 (FIG. 3) along the stroke axis S (FIG. 2). Second, the interaction between the protrusion 64 and the groove 62 can inhibit rotation of the pump lifer 44 relative to the housing 28 about the stroke axis S. It is important to inhibit rotation of the mechanical lifter 44 relative to the housing 28 to reduce the risk of misaligning the mechanical lifter 44 with respect to the cam portion 30. The protrusion 64 may be monolithically formed with the outer lift body 60. It is desirable to monolithically form the protrusion 64 with the outer lift body 60 to enhance the strength of the overall mechanical lifter 44 and simplify the manufacturing process. Alternatively, the protrusion 64 may be connected to the outer lift body 60. In the depicted embodiment, the protrusion 64 extends from the first body end 66 to the second body end 68 of the outer lift body 60 in a direction that is substantially parallel to the lift axis X. However, the protrusion 64 may only extend along a portion of the length of the outer lift body 60. Moreover, the protrusion 64 may be elongated along a direction that is obliquely angled in relation to the lift axis X.

As discussed above, the mechanical lifter 44 further includes an inner lift member 58 partly disposed in the outer lift cavity 72. Most of the inner lift member 58 is disposed within the outer lift member 56. Only the portion of the inner lift member 58 that engages the camshaft 32 is disposed outside the outer lift member 56. Accordingly, the inner lift member 58 is configured to receive a force applied by the camshaft 32 that in turn causes the mechanical lifter 44 to move relative to the housing 28 (FIG. 2) along the stroke axis S (FIG. 3).

The inner lift member 58 generally includes an inner member body 76, which can be constructed of a metallic material such as stainless steel. The inner member body 76 can be configured as a cup-shaped member 78 and has an inner surface 84 that defines an inner lift cavity 85. In addition, the inner member body 76 has an outer surface 86 that is coupled to the outer lift member 56. The outer lift member 56 can be bonded or adhered to the outer surface 86 of the inner member body 76. The inner member body 76 defines a first body hole 100 extending through the inner surface 84 and the outer surface 86. The first body hole 100 is configured and sized to receive another portion of the mechanical lifter 44 as discussed in detail below. The inner body member 76 further has a second body hole 102 extending through the inner surface 84 and the outer surface 86. The second body hole 102 is also configured and sized to receive another portion of the mechanical lifter 44 as discussed in detail below. The first body hole 100 is substantially aligned with the second body hole 102 along a roller axis Y. Further, the inner member body 76 has a first or top end surface 80 and an opposite second or bottom end surface 82. The first end surface 80 is spaced apart from the first body end 66 along the lift axis X, whereas the second end surface 82 is substantially aligned with the second body end 68 along the lift axis X. Moreover, the first end surface 80 is located closer to the pump body 26 (FIG. 3) than the second end surface 82. The inner lift member 58 has one or more holes 88 extending through the first end surface 80 to fluidly couple the outer lift cavity 72 with the inner lift cavity 85. As a result, a fluid, such as oil, can travel from the inner lift cavity 85 to the outer lift cavity 72 in order to lubricate the plunger 38 and the spring 46 (FIG. 3). The inner lift member 58 further has an opening 90 extending through the first end surface 80. The opening 90 leads to the inner lift cavity 85 of the inner member body 76.

In addition to the inner member body 76, the inner lift member 58 includes a roller, a drum, a wheel 92 or any suitable rotatable member configured to roll along the cam portion 30 of the camshaft 32 (FIG. 2). The roller 92 can be constructed of a metallic material and is configured to rotate relative to the inner member body 76 about the roller axis Y. At least a portion of the roller 92 extends through the opening 90 and is therefore disposed outside the inner member body 76, thereby allowing the roller 92 to contact the cam portion 30. Hence, the roller 92 is partly disposed within the inner lift member 58.

A roller shaft 94 supports the roller 92 and is elongated along the roller axis Y. At least a portion of the roller shaft 94 is disposed within the roller 92. The roller shaft 94 includes a first shaft end portion 96 and a second shaft end portion 98. The first shaft end portion 96 can be partly or wholly disposed in the first body hole 100. Thus, the first body hole 100 is configured and sized to receive at least the first shaft end portion 96 of the roller shaft 94. The second shaft end portion 98 can be partly or wholly disposed in the second body hole 102. Therefore, the second body hole 102 is configured and sized to receive at least the second shaft end portion 98 of the roller shaft 94. The first body hole 100 and the second body hole 102 allow the first shaft end portion 96 and the second shaft end portion 98 to be coupled to the outer lift member 56. Accordingly, the roller shaft 94 is operatively coupled to the outer lift member 56. For instance, the roller shaft 94 can be rotatably coupled to the outer lift member 56 to minimize wear and tear of the roller 92. Alternatively, the roller shaft 94 can be fixed to the outer lift member 56, thereby inhibiting the roller shaft 94 from rotating with respect to the outer lift member 56.

The inner lift member 58 further includes one or more bearings 104 disposed between the roller shaft 94 and the roller 92. The bearings 104 can be configured as needle bearings and can reduce the friction between the roller shaft 94 and the roller 92. In the depicted embodiment, the inner lift member 58 includes a plurality of bearings 104 surrounding the roller shaft 94. Moreover, the bearings 104 are disposed within the roller 92.

With reference again to FIGS. 2 and 4, during operation of the fuel pump assembly 24, the mechanical lifter 44 drives the plunger 38 along the stroke axis S in the second direction indicated by arrow B in response to a force applied by the cam portion 30 of the camshaft 32. Specifically, the camshaft 32 rotates about the rotation axis R when driven by a drive source (not shown). As the camshaft 32 rotates, the cam portion 30 turns about the rotation axis R. While the cam portion 30 turns, one of the lobes 36 eventually applies a force on the roller 92 in the direction indicated by arrow B. In response to the application of this force, the mechanical lifter 44 moves through the chamber 40 in the direction indicated by arrow B. Given that the plunger 38 is operatively coupled to the inner member body 76, the movement of the mechanical lifter 44 in the direction indicated by arrow B causes the movement of the plunger 38 in the same direction. As the plunger 38 moves in the second direction, which is indicated by arrow B, the fuel contained in the pump body 26 is pressurized. As the camshaft 32 continues to rotate, the lobe 36 moves away from the roller 92 and, therefore, the cam portion 30 no longer applies a force to the mechanical lifter 44 in the direction indicated by arrow B. Consequently, the plunger 38 moves in the direction indicated by the arrow A with the aid of the spring 46. While the plunger 38 moves in the first direction, which is indicated by arrow A, the low-pressure fuel 19L (FIG. 1) is admitted into the pump body 26. Hence, the movement of the plunger 38 in the first direction, which is indicated by arrow A, defines the intake stroke.

The mechanical lifter 44 may be manufactured using various techniques such as injection molding. First, the inner lift member 58 is received or obtained. As discussed above, the inner lift member 58 includes the metallic inner member body 76 and a roller 92 rotatably coupled with respect to the inner member body 76 of the inner lift member 58. The roller 92 is configured to rotate relative to the inner member body 76. Then, the polymeric outer lift member 56 is molded over the inner lift member 58 so as to bond the polymeric outer lift member 56 to the inner lift member 58. Injection molding or compression molding may be used to bond the polymeric outer lift member 56 to the inner lift member 58.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A mechanical lifter comprising:
an inner lift member at least partly made of a metallic material;
an outer lift member at least partly made of a polymeric material, the outer lift member surrounding the inner lift member;
a roller rotatably coupled with respect to the inner lift member, the roller being partly disposed within the inner lift member, wherein the inner lift member is configured to move a first component in response to a force applied to the roller by a second component; and
a shaft supporting the roller, wherein the shaft is fixed to the outer lift member, and at least a portion of the shaft is in direct contact with the outer lift member.

2. The mechanical lifter of claim 1, wherein the mechanical lifter has a mass ranging between about 68 grams and about 72 grams.

3. The mechanical lifter of claim 2, wherein the mechanical lifter has a mass of about 70 grams.

4. The mechanical lifter of claim 1, wherein an entirety of the inner lift member is disposed inside the outer lift member.

5. The mechanical lifter of claim 1, wherein the polymeric material includes a polyamide.

6. The mechanical lifter of claim 5, wherein the polymeric material includes a glass filled polyamide.

7. The mechanical lifter of claim 5, wherein the polymeric material includes a glass filled polyhexamethyleneadipamide.

8. The mechanical lifter of claim 6, wherein the polymeric material includes a 30% glass filled polyhexamethyleneadipamide.

9. The mechanical lifter of claim 1, wherein the outer lift member includes an outer lift body and a protrusion extending outwardly from the outer lift body, the protrusion being shaped and sized to be slidably received in a groove of a housing so as to inhibit rotation of the mechanical lifter relative to the housing.

10. The mechanical lifter of claim 9, wherein the protrusion is monolithically formed with the outer lift body.

11. A vehicle comprising:
an engine configured to power the vehicle, the engine including an engine component;
a housing; and
a fuel pump assembly in fluid communication with the engine so as to supply fuel to the engine, the fuel pump assembly including:
a pump body affixed to the housing and defining a pump bore, the pump bore defining a stroke axis;
a plunger at least partly disposed in the pump bore, the plunger being operatively coupled to the pump body such that the plunger is configured to move relative to the pump bore along the stroke axis;
a mechanical lifter disposed within the housing, the mechanical lifter being operatively coupled to the plunger such that the plunger is configured to move relative to the pump bore along the stroke axis upon movement of the mechanical lifter relative to the housing, the mechanical lifter including:
an outer lift member including a polymeric material;
an inner lift member at least partly disposed within the outer lift member, the outer lift member being molded over the inner lift member;
a roller rotatably coupled with respect to the inner lift member, the roller being partly disposed within the inner lift member, wherein the engine component is configured to apply a force to the roller so as to move the mechanical lifter relative to the housing along the stroke axis; and
a shaft supporting the roller, wherein at least a portion of the shaft is in direct contact with the outer lift member.

12. The vehicle of claim 11, wherein the mechanical lifter has a mass ranging between about 68 grams and about 72 grams.

13. The vehicle of claim 11, wherein the mechanical lifter has a mass of about 70 grams.

14. The vehicle of claim 11, wherein the polymeric material includes a polyamide.

15. The vehicle of claim 14, wherein the polyamide is selected from a group consisting of polyhexamethyleneadipamide, poly-6-caprolactam, and a combination thereof.

16. The vehicle of claim 14, wherein the polyamide is embedded with glass fibers.

17. The vehicle of claim 11, wherein the housing has an inner housing surface and a groove that extends into the inner housing surface, and the outer lift member includes an outer lift body and a protrusion extending from the outer lift body, the protrusion being shaped and sized to be slidably received in the groove so as to inhibit rotation of the mechanical lifter about the stroke axis.

18. The vehicle of claim 11, further comprising a shaft supporting the roller, wherein the shaft is directly fixed to the outer lift member.

19. A vehicle comprising:
an engine configured to power the vehicle, the engine including an engine component;
a housing; and
a fuel pump assembly in fluid communication with the engine so as to supply fuel to the engine, the fuel pump assembly including:
a pump body affixed to the housing and defining a pump bore, the pump bore defining a stroke axis;
a plunger at least partly disposed in the pump bore, the plunger being operatively coupled to the pump body such that the plunger is configured to move relative to the pump bore along the stroke axis;
a mechanical lifter disposed within the housing, the mechanical lifter being operatively coupled to the plunger such that the plunger is configured to move relative to the pump bore along the stroke axis upon movement of the mechanical lifter relative to the housing, the mechanical lifter including:
an outer lift member including a polymeric material;
an inner lift member at least partly disposed within the outer lift member, the outer lift member being molded over the inner lift member; and
a roller rotatably coupled with respect to the inner lift member, the roller being partly disposed within the inner lift member, wherein the engine component is configured to apply a force to the roller so as to move the mechanical lifter relative to the housing along the stroke axis; and
a shaft supporting the roller, wherein the shaft is directly fixed to the outer lift member.

* * * * *